US010800128B2

(12) United States Patent
Feie et al.

(10) Patent No.: US 10,800,128 B2
(45) Date of Patent: Oct. 13, 2020

(54) COMPOSITE COMPONENTS HAVING T OR L-JOINTS AND METHODS FOR FORMING SAME

(71) Applicant: General Electric Company, Schenectady, NY (US)

(72) Inventors: Brian Gregg Feie, Cincinnati, OH (US); Darrell Glenn Senile, Oxford, OH (US); Gregory Scott Phelps, Cincinnati, OH (US); Thomas Samuel Holaday, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/878,687

(22) Filed: Jan. 24, 2018

(65) Prior Publication Data

US 2019/0224938 A1    Jul. 25, 2019

(51) Int. Cl.
*B32B 3/02*      (2006.01)
*B32B 3/08*      (2006.01)
(Continued)

(52) U.S. Cl.
CPC ............ *B32B 3/08* (2013.01); *B29C 66/1122* (2013.01); *B29C 66/1222* (2013.01);
(Continued)

(58) Field of Classification Search
CPC ........ Y10T 428/24174; B29C 66/7214; B29C 66/72143; B29C 66/112; B29C 66/1222;
(Continued)

(56) References Cited

U.S. PATENT DOCUMENTS

| 4,177,306 A | 12/1979 | Schulz et al. |
| 5,639,535 A | 6/1997 | McCarville |

(Continued)

FOREIGN PATENT DOCUMENTS

| CN | 105538747 A | 5/2016 |
| FR | 2947204 A1 | 12/2010 |
| WO | WO2011/101513 A1 | 8/2011 |

OTHER PUBLICATIONS

European Search Report Corresponding to Application No. 19152401-6 dated Jun. 7, 2019.
Machine Translated Japanese Office Action Corresponding to Application No. 2019009268 dated May 19, 2020.

*Primary Examiner* — Alexander S Thomas
(74) *Attorney, Agent, or Firm* — Dority & Manning, P.A.

(57) ABSTRACT

Composite components having a T or L-shaped configuration that include features that reduce void defects between abutting laminate portions and provide improved mechanical properties are provided. Methods for forming such components are also provided. In one exemplary aspect, a composite component defines a first direction and a second direction and includes a wedged-shaped noodle at a joint interface between an abutting first laminate portion extending along the first direction and a second laminate portion extending along the second direction. The noodle has a first surface that is angled with respect to the second direction. At least one of the plies of the second laminate portion terminate and attach to the angled first surface of the noodle.

20 Claims, 8 Drawing Sheets

(51) Int. Cl.
| | |
|---|---|
| *B29C 70/68* | (2006.01) |
| *B29C 70/86* | (2006.01) |
| *B29C 65/00* | (2006.01) |
| *B32B 5/26* | (2006.01) |
| *B29D 99/00* | (2010.01) |
| *B29C 70/24* | (2006.01) |
| *B29C 70/54* | (2006.01) |
| *B29C 70/34* | (2006.01) |

(52) U.S. Cl.
CPC .... *B29C 66/1228* (2013.01); *B29C 66/43421* (2013.01); *B29C 66/43441* (2013.01); *B29C 70/24* (2013.01); *B29C 70/54* (2013.01); *B29C 70/682* (2013.01); *B29C 70/865* (2013.01); *B29D 99/0003* (2013.01); *B32B 5/26* (2013.01); *B29C 70/34* (2013.01); *Y10T 428/24174* (2015.01)

(58) Field of Classification Search
CPC .......... B29C 66/1228; B29C 66/43421; B29C 66/43441
See application file for complete search history.

(56) References Cited

U.S. PATENT DOCUMENTS

| | | | |
|---|---|---|---|
| 5,843,355 A * | 12/1998 | McCarville | B29C 70/345 264/152 |
| 5,919,543 A | 7/1999 | McCarville et al. | |
| 7,972,430 B2 | 7/2011 | Millard et al. | |
| 8,440,045 B2 | 5/2013 | Bremmer et al. | |
| 8,763,253 B2 | 7/2014 | Kamaraj et al. | |
| 8,943,697 B2 | 2/2015 | Kamaraj et al. | |
| 9,073,272 B2 | 7/2015 | Blot et al. | |
| 9,308,708 B2 | 4/2016 | Kleinow | |
| 9,359,060 B2 | 6/2016 | Kajita et al. | |
| 9,370,921 B2 | 6/2016 | Butler et al. | |
| 9,440,414 B2 | 9/2016 | Zarfos et al. | |
| 9,517,594 B2 | 12/2016 | Matsen et al. | |
| 2013/0004715 A1 | 1/2013 | Jarmon et al. | |
| 2017/0029577 A1 | 2/2017 | Glynn et al. | |
| 2017/0107840 A1 | 4/2017 | Stapleton et al. | |
| 2018/0093431 A1* | 4/2018 | Forston | B29C 66/131 |

* cited by examiner

COMPOSITE COMPONENTS HAVING T OR L-JOINTS AND METHODS FOR FORMING SAME

FIELD

The present subject matter relates generally to composite components for turbine engines. More particularly, the present subject matter relates to composite components having T or L-joints and methods for forming such components.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, components inside the combustion and turbine sections are complex to manufacture due to their geometries. Moreover, the working environment for such components is extremely severe due to the high temperature and pressures. Accordingly, components within the flow path of the combustion gases have strict requirements for their geometrical profiles and temperature tolerance to maintain desired efficiency of the engine. As ceramic matrix composite (CMC) materials can better withstand such severe environments than traditional materials, there is particular interest in replacing components formed of traditional materials inside gas turbine engine with CMC materials. Polymer matrix composites (PMC) materials may be used in gas turbine engines as well, e.g., in the compressor section.

Some composite components of gas turbine engines include butt joints, such as T or L joints. Butt joints typically include a butting laminate that includes a number of plies that butt directly in the normal direction to one or more plies of an interfacing laminate. The butting laminate is attached to or joined with the interfacing laminate at a joint interface. Typically, there is a large variance in ply shape and ply placement of the plies of the butting laminate, which presents a number of challenges when the butting laminate is attached to the interfacing laminate. For instance, the variance in ply shape and placement of the plies of the butting laminate may create an uneven surface for the butting laminate to attach to the interfacing laminate. In addition, there may be additional variances in the placement of the butting laminate relative to the desired attachment position of the interfacing laminate. These variances as well as other factors may increase the risk of void defects at the joint interface. Void defects at the butt joint of such composite components is undesirable as it leads to less than satisfactory mechanical properties, among other problems.

Conventionally, noodles or other structural members have been placed at the joint interface between abutting laminates to fill voids therebetween. While noodles and other structural members at least partially fill such voids, many of the problems noted above still persist. In particular, the variation in shape and placement of the plies of the butting laminate may still create problems when the butting laminate is attached to the interfacing laminate. That is, many of the plies of the butting laminate still butt directly into the plies of the interfacing laminate when the butting laminate is attached thereto.

Accordingly, improved methods and composite components that address one or more of the challenges noted above would be useful.

BRIEF DESCRIPTION

Aspects and advantages of the invention will be set forth in part in the following description, or may be obvious from the description, or may be learned through practice of the invention.

In one exemplary aspect, the present disclosure is directed to a composite component. The composite component defines a first direction and a second direction. The composite component includes a first laminate portion having a length extending along the first direction. The composite component also includes a second laminate portion having a length extending along the second direction. The second laminate portion includes a plurality of plies. The composite component further includes a noodle positioned at a joint interface between the first laminate portion and the second laminate portion. The noodle has a first surface that is angled with respect to the second direction. Further, at least one of the plurality of plies of the second laminate portion terminates and is attached to the noodle along the first surface.

In some embodiments, the first direction is orthogonal to the second direction.

In some embodiments, the first direction is substantially orthogonal to the second direction.

Further, in some embodiments, a plurality of the plies of the second laminate portion terminate and are attached to the noodle along the first surface. In such embodiments, the plies of the second laminate portion that terminate and are attached to the noodle along the first surface have successively different lengths such that the plurality of plies terminate and attach to the first surface in a staggered arrangement.

In another exemplary aspect, the present disclosure is directed to a composite component defining a second direction and a first direction. The composite component includes a first laminate portion having a length extending along the first direction and a second laminate portion having a length extending along the second direction. The second laminate portion includes a plurality of plies. The plurality of plies include a retaining ply that has a retaining portion that is detached from the other plies of the plurality of plies. Further, the composite component includes a noodle positioned at a joint interface between the first laminate portion and the second laminate portion. The noodle has a first surface that is angled with respect to the second direction and a second surface that is also angled with respect to the second direction. Moreover, at least one of the plurality of plies of the second laminate portion terminate and are attached to the noodle along the first surface and the retaining portion of the retaining ply extends along and is attached to the second surface of the noodle.

In another exemplary aspect, the present disclosure is directed to a method for forming a composite component defining a first direction and a second direction. The method includes laying up one or more plies to form a first laminate portion. The method also includes laying up one or more plies to form a second laminate portion. In addition, the method includes attaching at least one of the one or more plies of the second laminate portion to a noodle, wherein the one or more plies of the second laminate portion extend along the second direction and attach to and terminate at a first surface of the noodle that is angled with respect to the second direction. The method further includes securing the first laminate portion with the second laminate portion, wherein the one or more plies of the first laminate portion extend along the first direction when the first laminate portion is secured with the second laminate portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
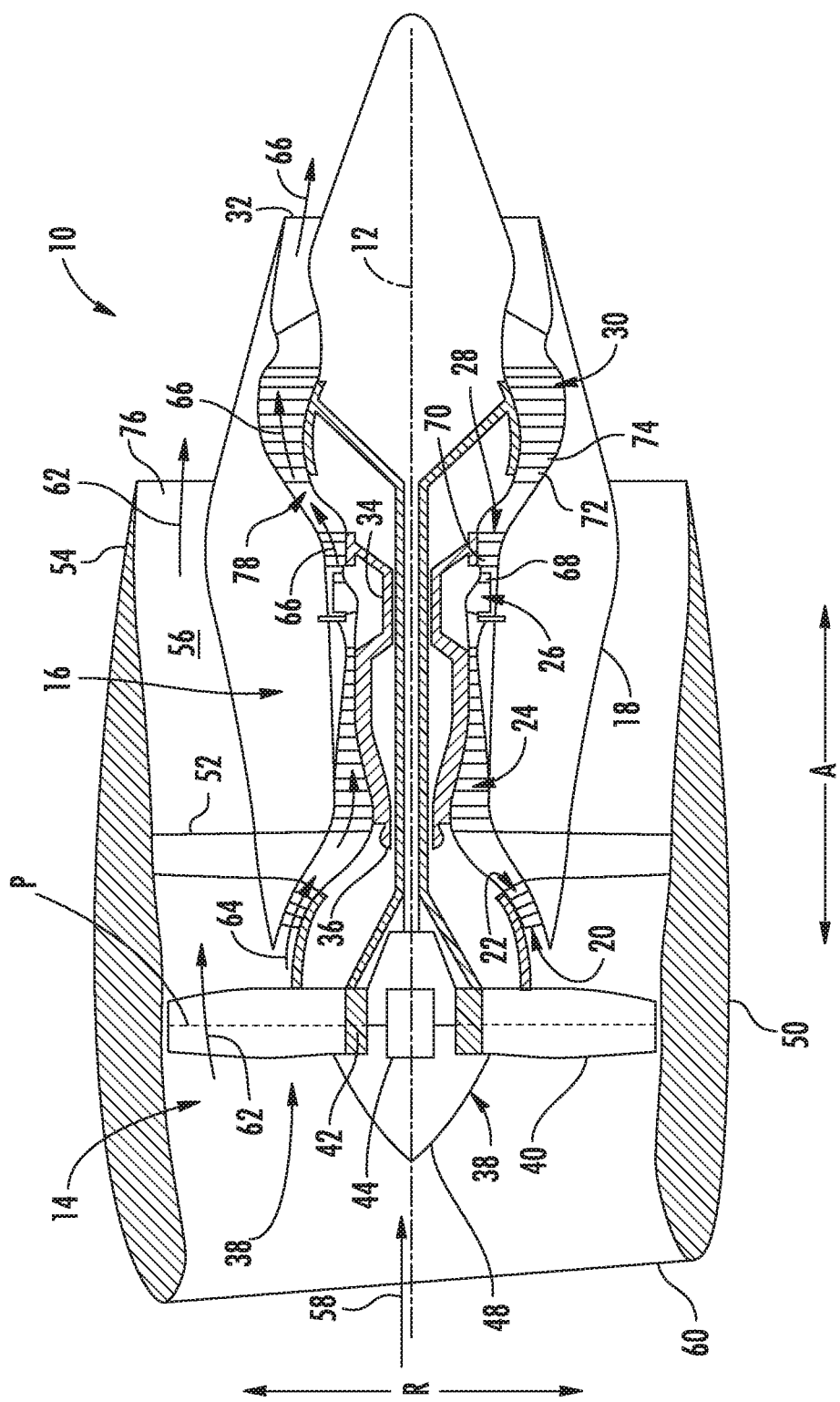
FIG. 1 is a schematic cross-sectional view of an exemplary gas turbine engine according to various embodiments of the present disclosure.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Furthermore, as used herein, terms of approximation, such as "approximately," "substantially," or "about," refer to being within a ten percent (10%) margin of error.

Exemplary aspects of the present disclosure are directed to composite components having a T or L-shaped configuration that include features that reduce void defects between abutting laminate portions and provide improved mechanical properties. Methods for forming such components are also provided. In one exemplary aspect, a composite component defines a first direction and a second direction and includes a wedged-shaped noodle at a joint interface between an abutting first laminate portion extending along the first direction and a second laminate portion extending along the second direction. The noodle has a first surface that is angled with respect to the second direction. At least one of the plies of the second laminate portion terminate at and attach to the angled first surface of the noodle. In this way, void defects along the joint interface may be reduced, thereby improving the mechanical properties of the composite component.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. In some embodiments, the fan blades 40, disk 42, and actuation member 44 are together rotatable about the longitudinal axis 12 by LP shaft 36 across a power gear box. The power gear box includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, steam turbine engines, industrial and marine gas turbine engines, and/or auxiliary power units.

In some embodiments, components of turbofan engine 10 can be formed of a composite material. For example, components within hot gas path 78, such as components of combustion section 26, HP turbine 28, and/or LP turbine 30, can be formed of a ceramic matrix composite (CMC) material, which is a non-metallic material having high temperature capability. For instance, turbine blades and turbine nozzles can be formed of CMC materials. Other components of turbine engine 10 also may be formed from CMC materials or other suitable composite materials, such as e.g., a polymer matrix composite (PMC) material.

Exemplary CMC materials utilized for such composite components can include silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

An exemplary fabrication process for such CMC components can include laying up one or more layers formed of "prepregs," or tape-like structures that include a reinforcement material (e.g., carbon fibers) impregnated with a slurry that contains a precursor of matrix material and one or more organic binders. The prepreg tapes undergo processing (including firing) to convert the precursor to the desired ceramic. Multiple plies of the resulting prepregs are then stacked and debulked to form a laminate preform.

Thereafter, the preform component can undergo a compaction process, a burnout process, and a melt infiltrate process to cure the preform. More specifically, after the layup process, the preform component can be processed in an autoclave and subjected to elevated temperatures and pressures to produce a compacted, green state component. Various volatiles can be removed during compaction. Then, the green state component can be placed in a furnace to burn out excess binders or the like and then can be placed in a furnace with a piece or slab of silicon and fired to melt infiltrate the component with at least silicon. More particularly, heating (i.e., firing) the green state component in a vacuum or inert atmosphere decomposes the binders, removes the solvents, and converts the precursor to the desired pyrolyzed material. The decomposition of the binders results in a porous pyrolyzed body; the body may undergo densification, e.g., melt infiltration (MI), to fill the porosity. In one example, where the pyrolyzed component is fired with silicon, the component can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified composite component can then be finish machined as necessary. For instance, the component can be grinded or otherwise machined, e.g., to bring the component within tolerance and to shape the component to the desired shape. It will be appreciated that other methods or processes for forming composite components can be used as well.

Figure 2:
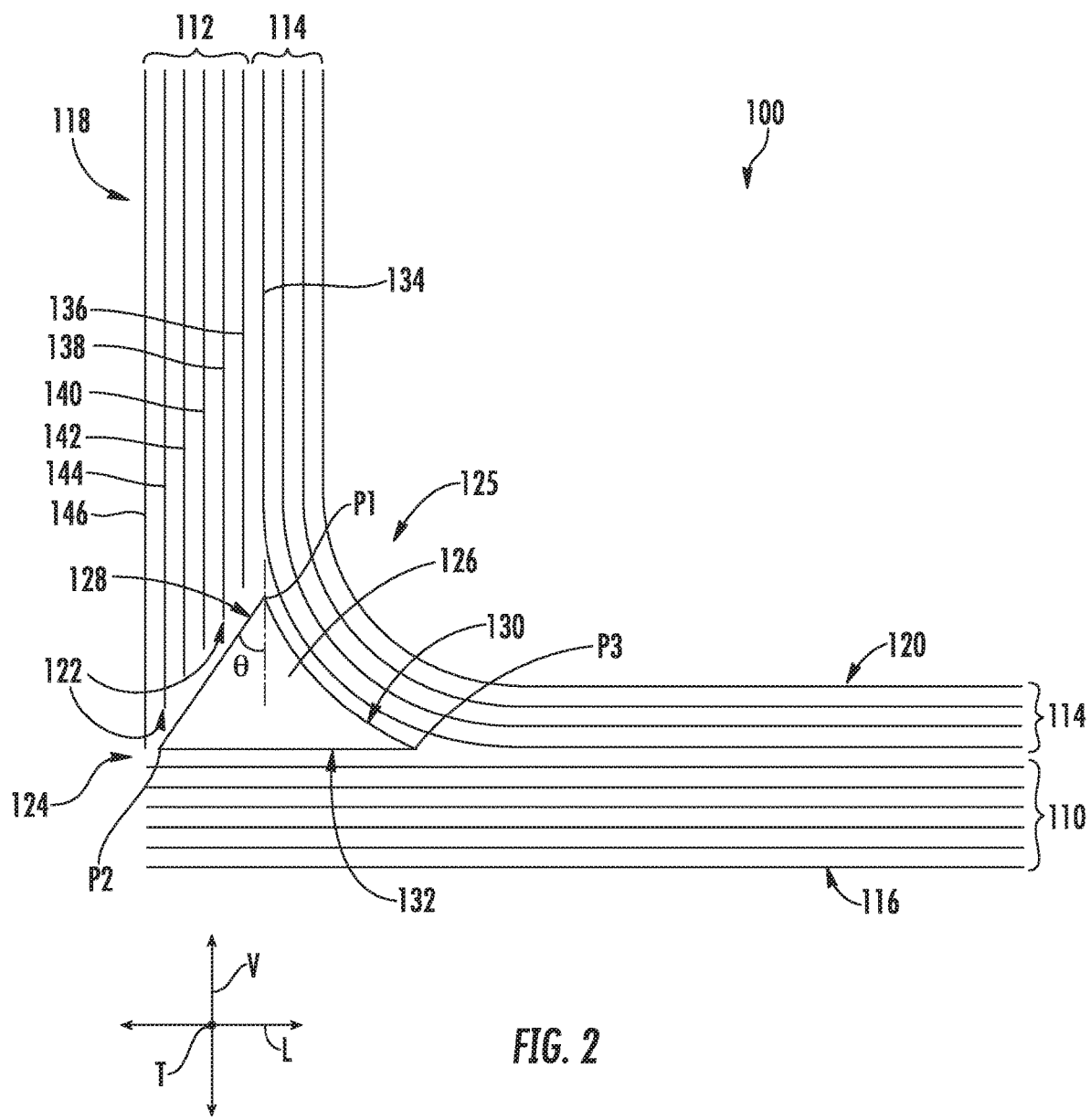
FIG. 2 provides a cross sectional view of an exemplary composite component having an L-joint configuration and a noodle at a joint interface of the composite component according to an exemplary embodiment of the present disclosure.

FIG. 2 provides a cross sectional view of an exemplary composite component 100 having an L-joint according to one exemplary embodiment of the present disclosure. The composite component 100 can be a CMC component of the turbofan engine 10 of FIG. 1, for example. For instance, the composite component 100 may be a turbine nozzle segment. In other exemplary embodiments, the composite component can be a PMC component of the turbofan engine 10 of FIG. 1. In FIG. 2, the laminate structure of the composite component 100 is depicted to illustrate the inventive aspects of the present disclosure.

As shown in FIG. 2, the composite component 100 defines a vertical direction V, a lateral direction L, and a transverse direction T (into and out of the page in FIG. 2). The vertical, lateral, and transverse directions V, L, and T are mutually perpendicular and form an orthogonal direction system. The composite component 100 includes a first laminate portion 110 having a length extending along the lateral direction L, a second laminate portion 112 having a length extending along the vertical direction V, and a cover laminate portion 114 that extends along both the vertical direction V and the lateral direction L and is attached to both the first laminate portion 110 and the second laminate portion 112. The first laminate portion 110 has a thickness along the vertical direction V and the second laminate portion 112 has a thickness along the lateral direction L. As one example, the first laminate portion 110 may be an airfoil laminate and the second laminate portion 112 may be an inner or outer band laminate of a turbine nozzle segment. As shown, the first laminate portion 110 is formed of plies 116, the second laminate portion 112 is formed of plies 118, and the cover laminate portion 114 is formed of plies 120. For this embodiment, the plies 116, 118, 120 of the laminate portions 110, 112, 114 are unidirectional plies formed of a CMC material, such as one of the CMC materials noted above. Moreover, plies 118 of the second laminate portion 112 extend between their respective first ends (not shown) to the their respective attachment ends 122.

For the depicted embodiment of FIG. 2, the second laminate portion 112 is attached to the first laminate portion 110 at a joint interface 124. In particular, the composite component 100 includes a wedged-shaped noodle 126 that is positioned at the joint interface 124 between the first laminate portion 110 and the second laminate portion 112. The noodle 126 is positioned and configured to reduce voids between plies of the abutting laminate portions 110, 112 and also provides a structure to which plies 116, 118, 120 may attach. This may, for example, provide improved mechanical properties of the composite component 100. Further, like the plies 116, 118, 120 of the laminate portions 110, 112, 114, the noodle 126 is formed of a CMC material in this embodiment. However, in alternative exemplary embodiments, the noodle 126 may be formed of any other suitable material, such as e.g., a PMC material, a ceramic material, a metallic material, a combination thereof, etc.

The noodle 126 has a first surface 128 that is angled with respect to the vertical direction V, and accordingly, the first surface 128 is angled with respect to the direction of the laid up plies 118 of the second laminate portion 112. For this embodiment, the first surface 128 is angled with respect to the vertical direction V by about thirty degrees (30°), as denoted by the angle theta (θ) in FIG. 2. In other embodiments, the first surface 128 may be angled with respect to the vertical direction V between ten degrees (10°) and eighty degrees (80°). Preferably, the first surface 128 is angled with respect to the vertical direction V between twenty degrees (20°) and seventy degrees (70°). In addition, the noodle 126 has a second surface 130 that is angled with respect to the vertical direction V, and thus, the second surface 130 is angled with respect to the direction of the laid up plies 118 of the second laminate portion 112, as well as the plies 120 of the cover laminate portion 114 as they extend along the vertical direction V. Further, in this exemplary embodiment, the second surface 130 of the noodle 126 is curved. In particular, the second surface 130 is curved complementary to the shape of the curve of the cover laminate portion 114. Stated differently, the second surface 130 has a curved concave shape with respect to an interior region 125 of the joint interface 124. In addition, the noodle 126 also has a butt surface 132 that extends along the lateral direction L and abuts and attaches to one of the plies 116 of the first laminate portion 110. For the depicted cross section of the noodle 126, the first surface 128 and the second surface 130 intersect at an edge or first point P1, the second surface 130 and the butt surface 132 intersect at an edge or second point P2, and the second surface 130 and the butt surface 132 intersect at an edge or third point P3. Although the edges or points connecting the surfaces of the noodle 126 are shown as pointy tips in the depicted embodiment of FIG. 2, in alternative embodiments, the edges or points may be rounded, chamfered, flat, or may have other suitable geometries to connect the surfaces of the noodle 126.

When the composite component 100 is assembled, the butt surface 132 of the noodle 126 is attached to one of the plies 116 of the first laminate portion 110, as noted above. Further, as the cover laminate portion 114 extends along the vertical direction V, an inner cover ply 134 of the cover laminate portion 114 is attached to one of the plies 118 of the second laminate portion 112. The inner cover ply 134 then extends along and is attached to the second surface 130 of the noodle 126 as the cover laminate portion 114 curves from the vertical direction V to the lateral direction L. Thereafter, the inner cover ply 134 extends along and is attached to one of the plies 116 of the first laminate portion 110 as the cover laminate portion 114 extends along the lateral direction L.

In addition, as depicted in FIG. 2, the second laminate portion 112 is attached to the first surface 128 of the noodle 126. In particular, the attachment ends 122 of some of the plies 118 of the second laminate portion 112 terminate and are attached to the angled first surface 128 of the noodle 126. More particularly still, the attachment ends 122 of the plies 118 of the second laminate portion 112 terminate and are attached to the noodle 126 along the first surface 128 in a staggered arrangement. That is, the attachment ends 122 of the plies 118 of the second laminate portion 112 terminate (or drop-off) and attach to the first surface 128 of the noodle 126 at different positions along the angled first surface 128. Accordingly, as shown, the plies 118 of the second laminate portion 112 that attach to the first surface 128 of the noodle 126 have successively different lengths so that they terminate and attach to the first surface 128 in the staggered arrangement. It will be appreciated that assembly of the laminate portions may be completed in any suitable order. For instance, the second laminate portion 112 may be attached to the cover laminate portion 114 before the first laminate portion 110 is attached.

For the exemplary embodiment of FIG. 2, a first ply 136 of the second laminate portion 112 terminates and attaches to the first surface 128 of the noodle 126 proximate the first point P1 (i.e., the intersection of the first surface 128 and the second surface 130). A second ply 138 laid up adjacent to the first ply 136 has a slightly longer length than the first ply 136. In this way, the second ply 138 may extend and attach to the first surface 128 at a position that is further from the first point P1 than where the first ply 136 attaches to the first surface 128, e.g., further from first point P1 along the vertical direction V and lateral direction L. A third ply 140 of the second laminate portion 112 laid up adjacent to the second ply 138 has a slightly longer length than the second ply 138. In this way, the third ply 140 may extend and attach to the first surface 128 at a position that is further from the first point P1 than where the second ply 138 attaches to the first surface 128. This pattern continues for a fourth ply 142, a fifth ply 144, and a sixth ply 146 of the second laminate portion 112 as shown. That is, the fourth ply 142 has a longer length than the third ply 140 and attaches to the first surface 128 at a position that is further from the first point P1 than where the third ply 140 attaches to the first surface 128, the fifth ply 144 has a longer length than the fourth ply 142 and attaches to the first surface 128 at a position that is further from the first point P1 than where the fourth ply 142 attaches to the first surface 128, and the sixth ply 146 has a longer length than the fifth ply 144 and attaches to the first surface 128 at a position that is further from the first point P1 than where the fifth ply 144 attaches to the first surface 128. Indeed, as shown, the sixth ply 146 attaches to the second point P2 of the noodle 126 where the first surface 128 intersects with the butt surface 132. Although the various plies 118 of the second laminate portion 112 are shown in FIG. 2 not in actual contact with the first surface 128 of the noodle 126, it will be appreciated that one, some, all, or none of the plies 118 may actually contact the first surface 128 as they attach to and terminate along the first surface 128 of the noodle 126.

The angled interface between the noodle 126 and plies 118 of the second laminate portion 112 allows for shallow ply drops and may better fill potential voids that may form at the joint interface 124. Further, as will be explained further below, the angled interface between the plies 118 of the second laminate portion 112 and the first surface 128 of the noodle 126 helps retain the shape and position of the noodle 126 by controlling the direction in which compaction is applied to the noodle 126.

Figure 3:
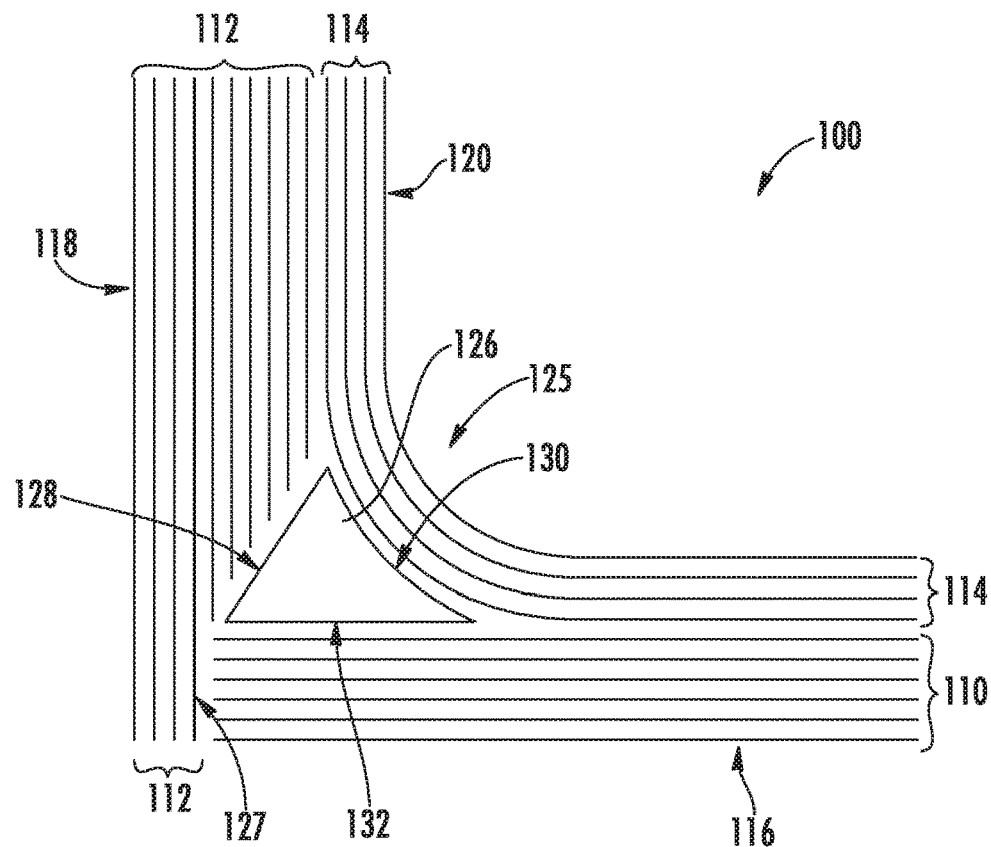
FIG. 3 provides a cross sectional view of another exemplary composite component having an L-joint configuration and a noodle at a joint interface of the composite component according to an exemplary embodiment of the present disclosure.

FIG. 3 provides a cross sectional view of another exemplary composite component 100 having an L-joint configuration according to one exemplary embodiment of the present disclosure. The exemplary composite component 100 of FIG. 3 is configured in a similar manner as the composite component of FIG. 2, and accordingly, the same or similar reference numerals will be used to refer to like or similar parts. In contrast with the composite component of FIG. 2, the composite component 100 of FIG. 3 includes some plies 118 of the second laminate portion 112 that do not terminate into or attach to the first surface 128 of the noodle 126. As shown, some of the plies 118 of the second laminate portion 112 extend downward past the noodle 126 along the vertical direction V and define a vertical interface 127 to which the plies 116 of the first laminate portion 110 butt into or attach. By extending some of the plies 118 of the second laminate portion 112 in a manner as shown in FIG. 3, the second laminate portion 112 may be further secured to the first laminate portion 110.

Figure 4:
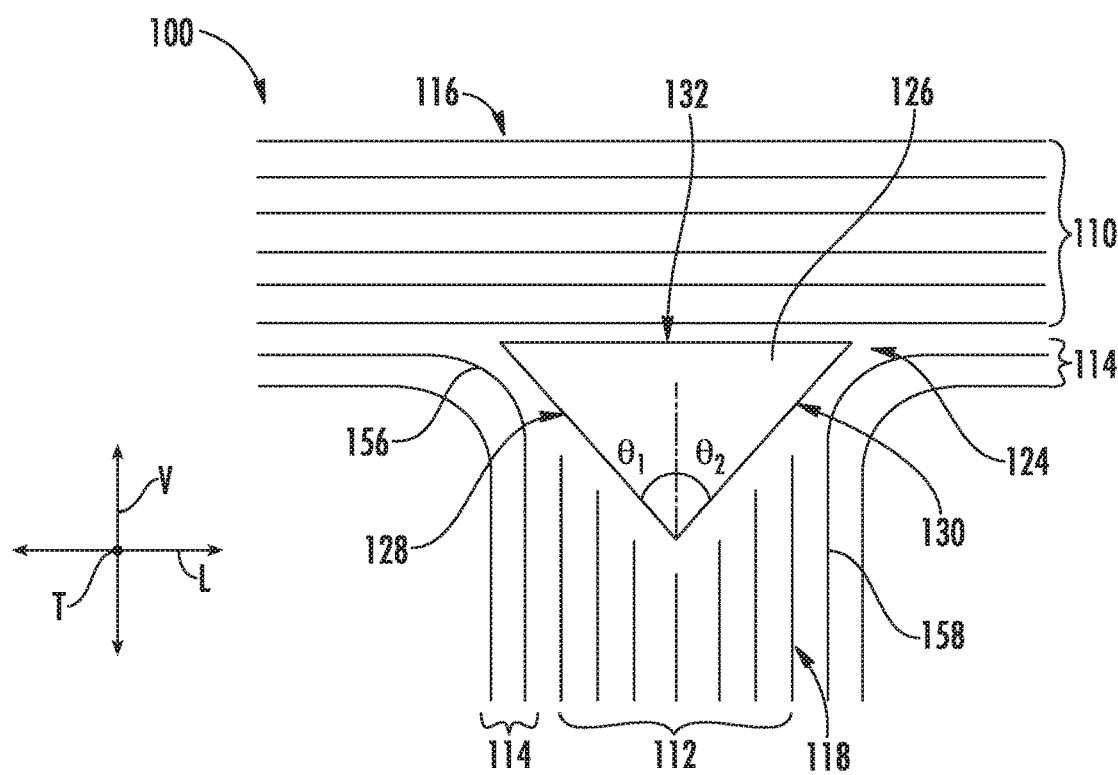
FIG. 4 provides a cross sectional view of an exemplary composite component having a T-joint configuration and a noodle at a joint interface of the composite component according to an exemplary embodiment of the present disclosure.

FIG. 4 provides a cross sectional view of another exemplary composite component 100 having a T-joint configuration according to one exemplary embodiment of the present disclosure. For this embodiment, the noodle 126 includes first surface 128 angled with respect to the vertical direction V and second surface 130 angled within respect to the vertical direction V without curvature. That is, the second surface 130 has a straight angled surface in this embodiment. More particularly, in this embodiment, the first surface 128 is angled with respect to the vertical direction V by about negative forty degrees (−40°), denoted by $\theta_1$, and the second surface 130 of the noodle 126 is angled with respect to the vertical direction V by about forty degrees (40°), denoted by $\theta_2$. Further, for this exemplary embodiment, some of the plies 118 of the second laminate portion 112 attach to and terminate along the angled first surface 128 of the noodle 126 in a staggered arrangement and some of the plies 118 of the second laminate portion 118 attach to and terminate along the angled second surface 130 of the noodle 126 in a staggered arrangement. The staggered arrangement of the plies 118 with the noodle 126 fills voids created by the variances in ply shape and length during layup, and accordingly, a composite component 100 with improved mechanical properties may result.

As further shown in FIG. 4, a first cover ply 156 extends along the vertical direction V and is attached to one of the plies 118 of the second laminate portion 112. The first cover ply 156 then attaches to and extends along at least a portion of the first surface 128 of the noodle 126, and thereafter, the first cover ply 156 extends along the first laminate portion 110 along the lateral direction L and is attached to one of the plies 116 of the first laminate portion 110. A second cover ply 158 extends along the along the vertical direction V and is attached to one of the plies 118 of the second laminate portion 112. The second cover ply 158 then attaches to and extends along at least a portion of the second surface 130 of the noodle 126, and then, the second cover ply 158 extends along the first laminate portion 110 along the lateral direction L and is attached to one of the plies 116 of the first laminate portion 110. The first and second cover plies 156, 158 further fill in potential voids at the joint interface 124 and further secure the first laminate portion 110 with the second laminate portion 112.

Figure 5:
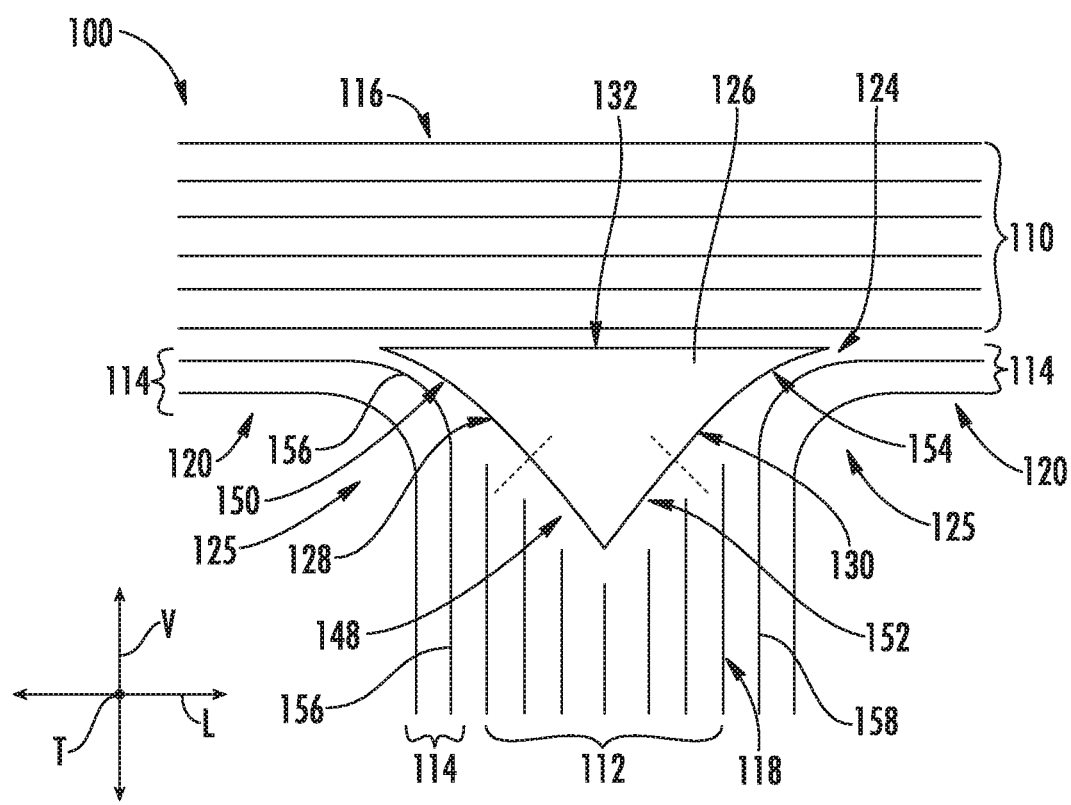
FIG. 5 provides a cross sectional view of another exemplary composite component having a T-joint configuration and a noodle at a joint interface of the composite component according to an exemplary embodiment of the present disclosure.

FIG. 5 provides a cross sectional view of another exemplary composite component 100 having a T-joint according to one exemplary embodiment of the present disclosure. The exemplary composite component 100 of FIG. 5 is configured in a similar manner as the composite component of FIG. 4, and accordingly, the same or similar reference numerals will be used to refer to like or similar parts. In contrast with the composite component of FIG. 4, the composite component 100 of FIG. 5 includes noodle 126 with different first and second surfaces 129, 130. In particular, for this embodiment, the first surface 128 has a straight angle portion 148 and a curved portion 150 that is contiguous with the straight angle portion 148. The dashed line shown in FIG. 5 demarcates the straight angle portion 148 from the curved portion 150. Likewise, the second surface 130 of the noodle 126 has a straight angle portion 152 and a curved portion 154 that is contiguous with the straight angle portion 152. The dashed line shown in FIG. 5 demarcates the straight angle portion 152 from the curved portion 154. For this embodiment, the straight angle portions 148, 152 of the first and second surfaces 128, 130 are angled with respect to the vertical direction V by about negative forty degrees (−40°) and by about forty degrees (40°), respectively. The curved portions 150, 154 of the first and second surfaces 128, 130 are each curved complementary to the curved shapes of their respective plies 120 of the cover laminate portions 114. Stated differently, the curved portions 150, 154 are each curved concave with respect to the their respective interior regions 125 of the joint interface 124.

Moreover, as shown in FIG. 5, some of the plies 118 of the second laminate portion 112 terminate and attach to the straight angle portion 148 of the first surface 128 in a staggered arrangement and some of the plies 118 of the second laminate portion 112 terminate and attach to the straight angle portion 152 of the second surface 130 in a staggered arrangement. Further, as shown in FIG. 5, first cover ply 156 extends along the second laminate portion 112 along the vertical direction V, attaches to and extends along the curved portion 150 of the first surface 128 of the noodle 126, and then extends along the first laminate portion 110 along the lateral direction L. Second cover ply 158 extends along the second laminate portion 112 along the vertical direction V, attaches to and extends along the curved portion 154 of the second surface 130 of the noodle 126, and then extends along the first laminate portion 110 along the lateral direction L. In addition to providing a secure attachment surface for the plies 120 of the cover laminate portions 114, the curved portions 150, 154 of the first and second surfaces 128, 130 provide a curvature template that may facilitate the layup of the cover plies, which ultimately may improve part-to-part or component-to-component consistency.

Figure 6:
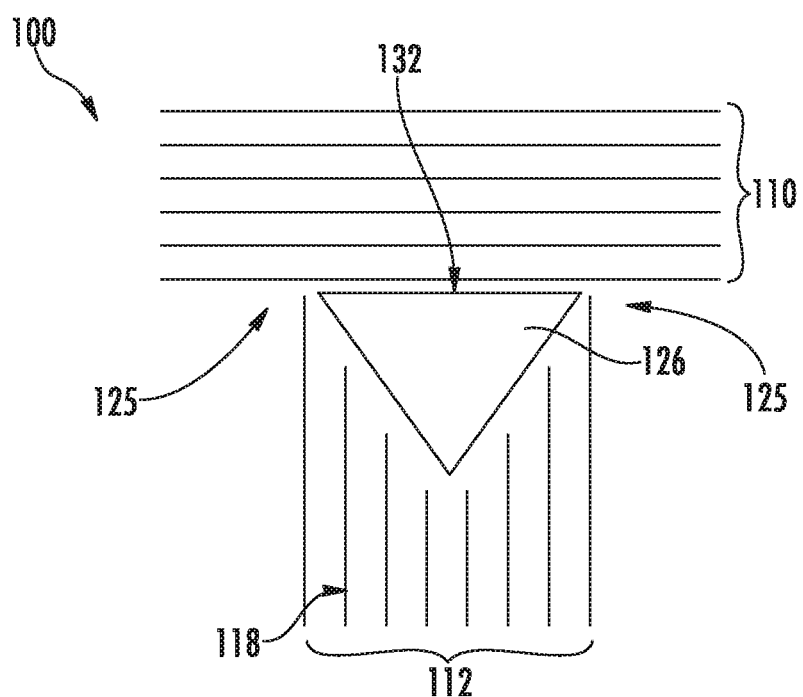
FIG. 6 provides a cross sectional view of yet another exemplary composite component having a T-joint configuration and a noodle at a joint interface of the composite component according to an exemplary embodiment of the present disclosure.

FIG. 6 provides a cross sectional view of another exemplary composite component 100 having a T-joint configuration according to one exemplary embodiment of the present disclosure. The exemplary composite component 100 of FIG. 6 is configured in a similar manner as the composite component of FIG. 4, and accordingly, the same or similar reference numerals will be used to refer to like or similar parts. In contrast with the composite component of FIG. 4, the composite component 100 of FIG. 6 does not include cover laminate portions 114 (see FIG. 4) connecting the first laminate portion 110 with the second laminate portion 112. The first laminate portion 110 is attached to the noodle 126 along its butt surface 132. Further, plies 118 at opposing sides of the second laminate portion 112 along the lateral direction L are attached to the first laminate portion 110 by butt joint attachments. In this way, the first laminate portion 110 is secured or connected to the second laminate portion 112. The embodiment of the composite component 100 of FIG. 6 may be particularly advantageous for applications where a straight edge is desired at the interior region 125 of the joint interface 124 or if it is desired to maintain a minimal thickness of the first and/or second laminate portions 110, 112.

Figure 7:
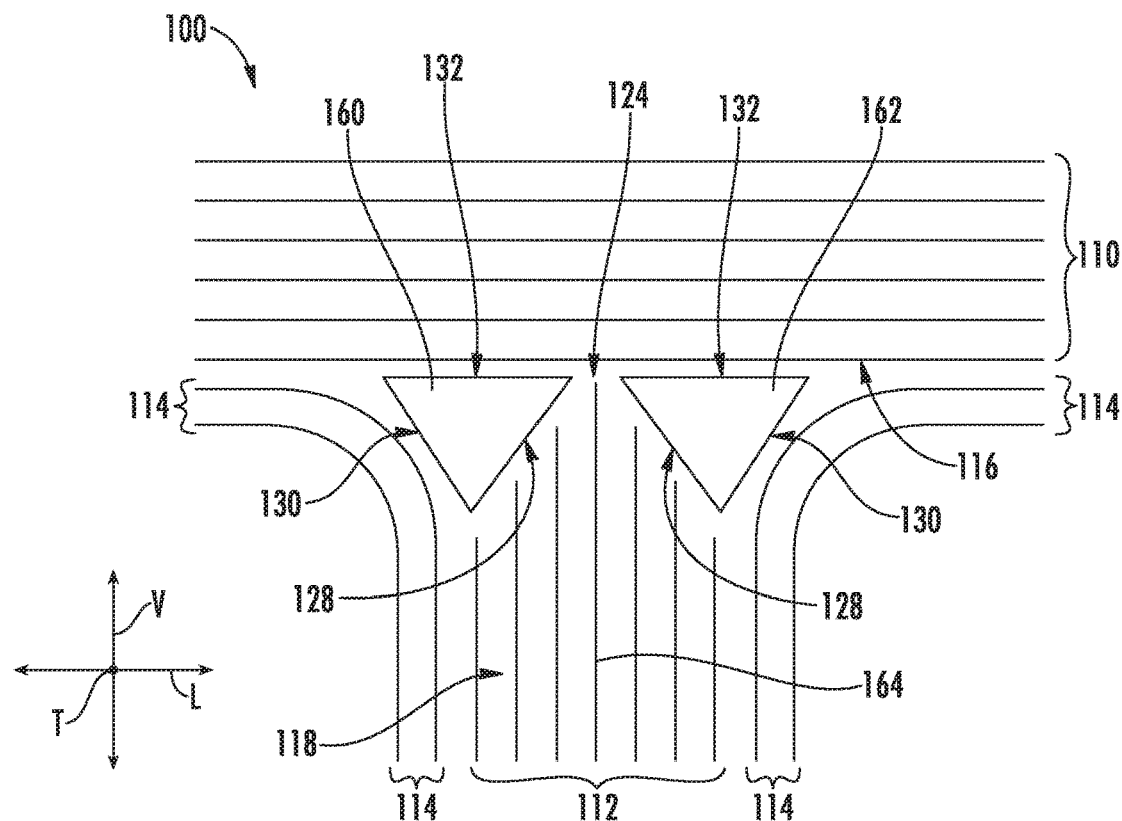
FIG. 7 provides a cross sectional view of an exemplary composite component having a T-joint configuration and multiple noodles at a joint interface of the composite component according to an exemplary embodiment of the present disclosure.

FIG. 7 provides a cross sectional view of another exemplary composite component 100 having a T-joint according to one exemplary embodiment of the present disclosure. For this embodiment, the composite component 100 includes a first noodle 160 and a second noodle 162. Both the first and second noodles 160, 162 are wedged-shaped noodles that both include angled first surfaces 128, angled second surfaces 130, and butt surfaces 132. Notably, for this embodiment, as two smaller noodles are provided at the joint interface 124 (i.e., instead of one larger noodle as depicted in FIGS. 4, 5, and 6), the structural plies of the second laminate portion 112 may cover more area, and thus, the composite component 100 may have improved structural integrity. For instance, as shown in FIG. 7, an abutting ply 164 of the second laminate portion 112 extends along the length of the second laminate portion 112 along the vertical direction V and abuts one of the plies 116 of the first laminate portion 110. Further, due to the geometry and positioning of the first and second noodles 160, 162 of FIG. 7, the plies 118 of the second laminate portion 112 are able to extend closer to the joint interface 124, e.g., compared to the plies 118 of the second laminate portion 112 of FIGS. 4 and 5. Thus, the plies 118 may provide improved structural integrity and mechanical properties of the composite component 100.

Figure 8:
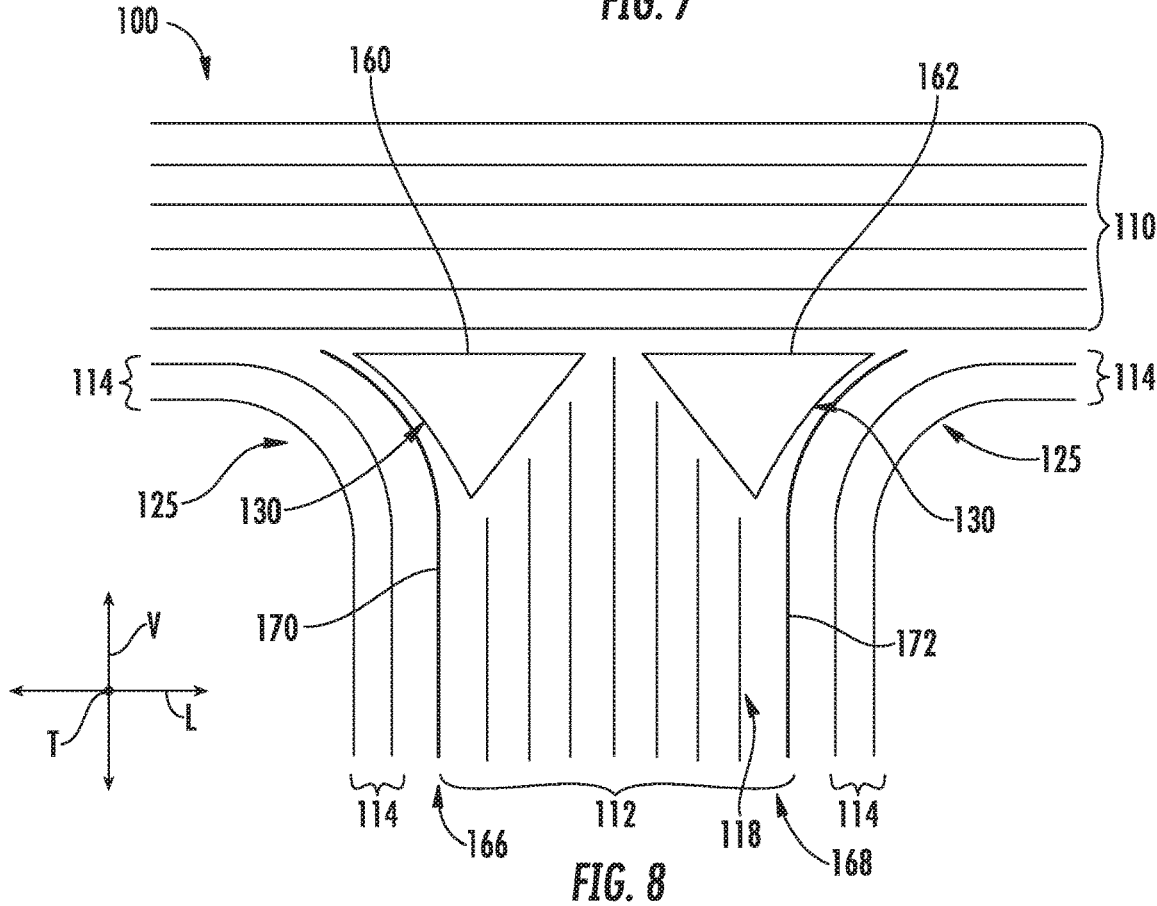
FIG. 8 provides a cross sectional view of another exemplary composite component having a T-joint configuration and multiple noodles at a joint interface of the composite component according to an exemplary embodiment of the present disclosure.
Figure 9:
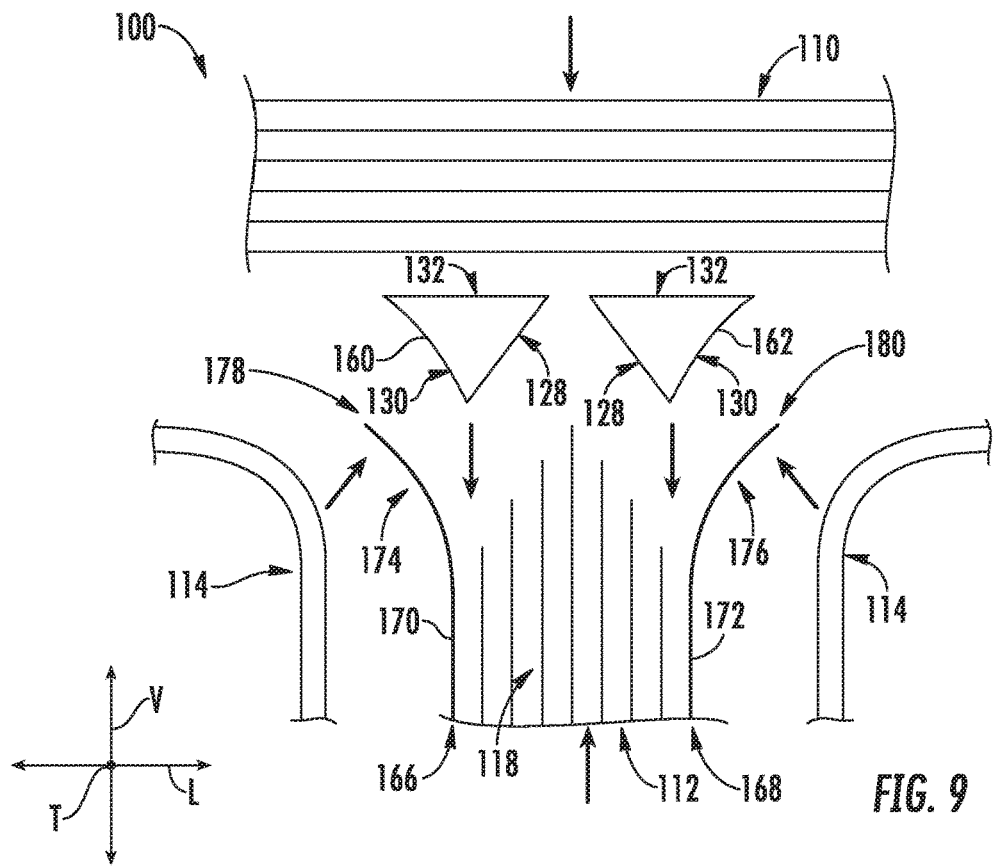
FIG. 9 provides an exploded, cross sectional view of the composite component of FIG. 8.

FIGS. 8 and 9 provide cross sectional views of another exemplary composite component 100 having a T-joint configuration according to one exemplary embodiment of the present disclosure. In FIG. 8, the composite component 100 is shown assembled. In FIG. 9, the composite component 100 is shown in an exploded view. For this embodiment, like the depicted embodiment of FIG. 7, the composite component 100 includes first noodle 160 and second noodle 162. The second surfaces 130 of the first noodle 160 and the second noodle 162 are curved, and more particularly, the second surfaces 130 are curved concave with respect to their respective interior regions 125.

The second laminate portion 112 extends between a first side 166 and a second side 168 along the lateral direction L. Notably, for this embodiment, the second laminate portion 112 of the composite component 100 includes a first retaining ply 170 and a second retaining ply 172. The first retaining ply 170 and the second retaining ply 172 are bolded in FIGS. 8 and 9 for illustrative purposes, however in some embodiments, the retaining plies 170, 171 may be thicker than the other plies 118 of the second laminate portion 112. The first retaining ply 170 extends generally along the vertical direction V and along the first side 166 of the second laminate portion 112. The second retaining ply 172 extends generally along the vertical direction V and along the second side 168 of the second laminate portion 112. The first retaining ply 170 includes a retaining portion 174 and the second retaining ply 172 includes a retaining portion 176 as well. As shown particularly in FIG. 9, the retaining portions 174, 176 of the first and second retaining plies 170, 172 are detached from the other plies 118 of the second laminate portion 112. The first retaining ply 170 terminates at a terminating end 178 and the second retaining ply 172 terminates at a terminating end 180.

As shown in FIG. 8, when composite component 100 is assembled, the retaining portion 174 of the first retaining ply 170 extends along and is attached to at least a portion of the second surface 130 of the first noodle 160. Thereafter, the first retaining ply 170 terminates at its terminating end 178 proximate the second point P2 of the first noodle 160 (i.e., the intersection of the second surface 130 and the butt surface 132). The first retaining ply 170 retains the first noodle 160 in place and also secures the plies 118 of the second laminate portion 112 against the first surface 128 of the first noodle 160 in the staggered arrangement. In a similar fashion, the retaining portion 176 of the second retaining ply 172 extends along and is attached to at least a portion of the second surface 130 of the second noodle 162. Thereafter, the second retaining ply 172 terminates at its terminating end 180 proximate the second point P2 of the second noodle 162. The second retaining ply 172 retains the second noodle 162 in place and also secures the plies 118 of the second laminate portion 112 against the first surface 128 of the second noodle 162 in the staggered arrangement. Further, as will be explained in more detail below, the retaining plies 170, 172 facilitate compaction of the composite component 100.

Figure 10:
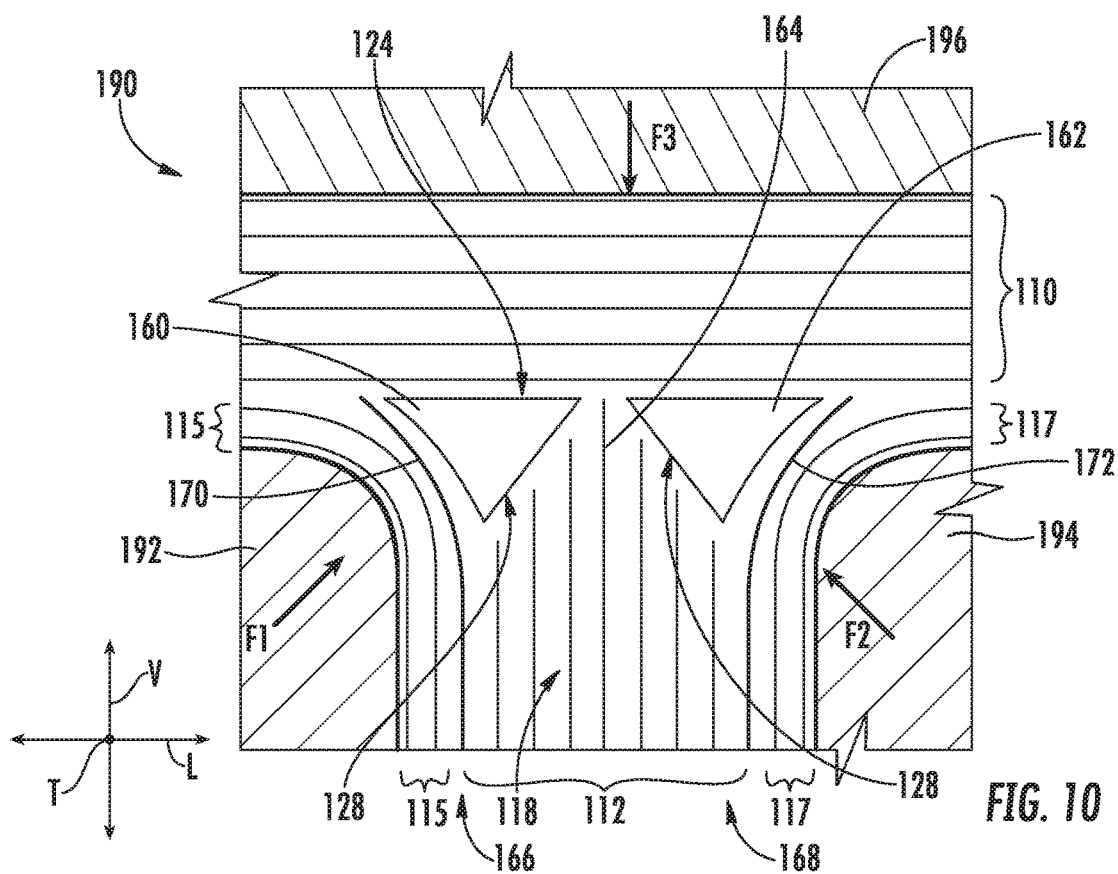
FIG. 10 provides a cross sectional view of the composite component of FIG. 8 undergoing a compaction process.

FIG. 10 provides a cross sectional view of the composite component 100 of FIGS. 8 and 9 depicting the composite component 100 undergoing a compaction process. As shown in FIG. 10, the compaction tool 190 includes a first tool portion 192 positioned along a first cover laminate portion 115, a second tool portion 194 positioned along a second cover laminate portion 117, and a third tool portion 196 positioned along the first laminate portion 110. The compaction tool 190 and the composite component 100 may be enclosed within an autoclave where they are subjected to elevated temperatures and pressures during a compaction cycle.

During a compaction process, the first tool portion 192 applies a force F1 on the composite component 100 and the second tool portion 194 applies a force F2 on the composite component 100. The force F1 is applied along both the vertical and lateral directions V, L, and likewise, the force F2 is applied along both the vertical and lateral directions V, L as shown in FIG. 10. The third tool portion 196 applies a counteracting force F3 along the vertical direction V. As the composite component 100 is compacted by the compaction tool 190, the retaining plies 170, 172 of the second laminate portion 112 drive the other plies 118 of the second laminate portion 112 into the joint interface 124. More particularly, the retaining plies 170, 172 provide a structure to which the applied forces F1, F2 may drive the plies 118 of the second laminate portion 112 into the angled first surfaces 128 of the first noodle 160 and the second noodle 162. The forces F1, F2 applied to the retaining plies 170, 172 may also drive the abutting ply 164 or plies into butting engagement with the first laminate portion 110. In this way, the second laminate portion 112 is driven into the joint interface 124, and consequently, void defects in the composite component 100 at the joint interface 124 are reduced.

Figure 11:
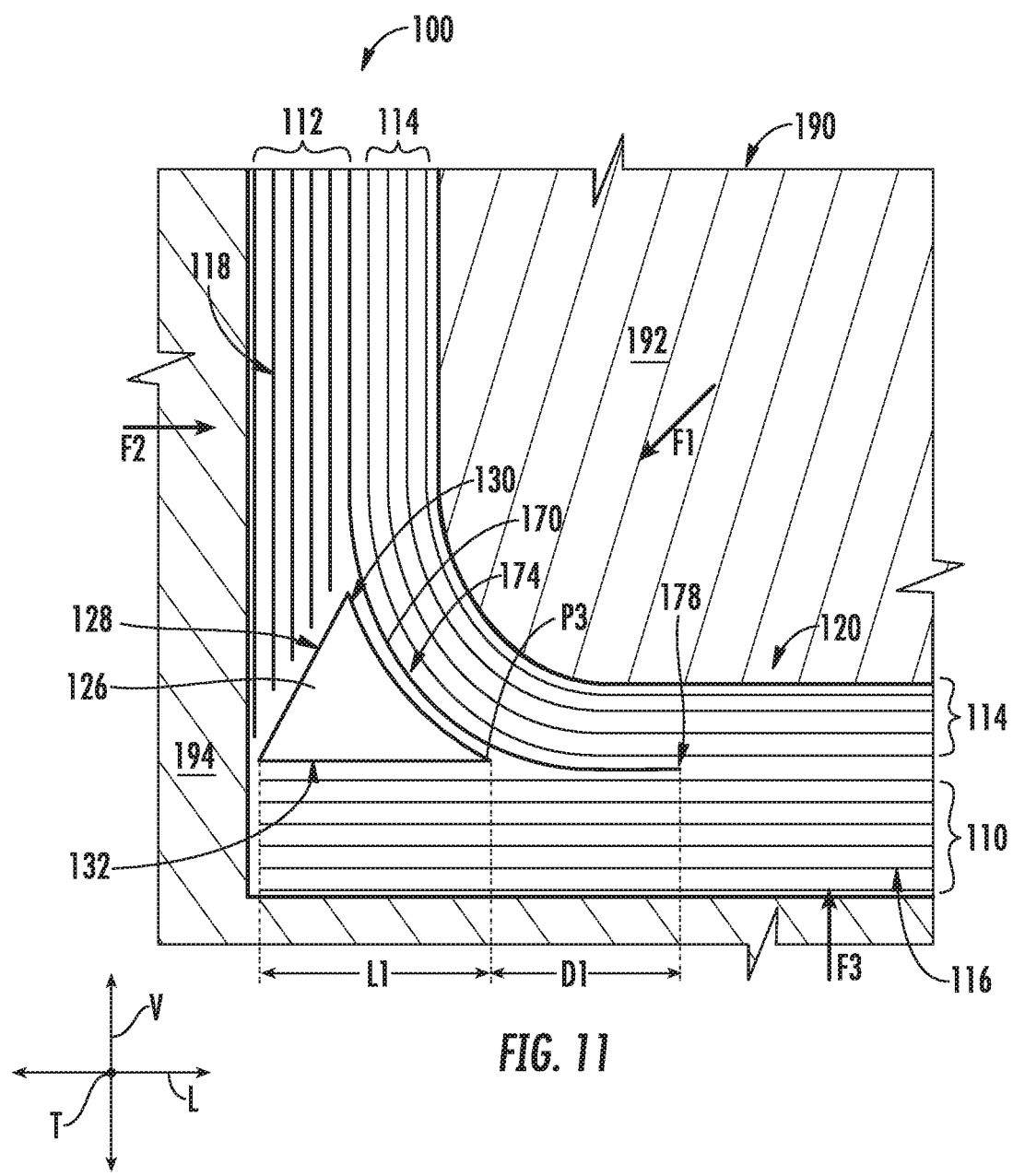
FIG. 11 provides a cross sectional view of an exemplary composite component having an L-joint configuration and a noodle at a joint interface of the composite component and depicts the composite component undergoing a compaction process according to an exemplary embodiment of the present disclosure.

FIG. 11 provides a cross sectional view of an exemplary composite component 100 having an L-joint configuration undergoing a compaction process according to an exemplary embodiment of the present disclosure. As shown in FIG. 11, for this embodiment, the second laminate portion 112 includes retaining ply 170 that has retaining portion 174 that is detached from the other plies 118 of the second laminate portion 112. The plies 118 of the second laminate portion 112, including the retaining ply 170, are shown in FIG. 11 bolded for illustrative purposes. Moreover, as shown in FIG. 11, the retaining portion 174 of the retaining ply 170 extends along and is attached to the curved second surface 130 of the noodle 126. Moreover, for this embodiment, after the retaining ply 170 extends along and is attached to the second surface 130, the retaining ply 170 extends a distance along the lateral direction L. In particular, the retaining ply 170 extends along the lateral direction L outward from the third point P3 (i.e., the intersection of the second surface 130 and the butt surface 132 of the noodle 126) a distance D1 that is at least a quarter of the total lateral length L1 of the noddle 126. In some alternative embodiments, the retaining ply 170 extends along the lateral direction L outward from the third point P3 a distance that is at least half of the total lateral length L1 of the noddle 126. By extending the retaining ply 170 along the lateral direction L, when the second laminate portion 112 is assembled with the first laminate portion 110, the retaining ply 170 facilitates the seating of the noodle 126 along the first laminate portion 110 and also may provide a more secure attachment of first laminate portion 110 with second laminate portion 112. Additionally, the retaining ply 170 may fill void defects at the joint interface 124 that otherwise would not be filled but for the retaining ply 170 extending along the lateral direction L, and if a cover laminate portion is assembled with the first and second laminate portions 110, 112 as shown in FIG. 11, the retaining ply 170 may fill in voids between the cover laminate portion 114 and the first laminate portion 110. Accordingly, the composite component 100 may have improved mechanical properties.

As further depicted in FIG. 11, the compaction tool 190 includes first tool portion 192 positioned along cover laminate portion 114 and second tool portion 194 positioned along the second laminate portion 112 along the vertical direction V and the first laminate portion 110 along the lateral direction L. The compaction tool 190 and the composite component 100 may be enclosed within an autoclave during a compaction cycle where they may be subjected to elevated temperatures and pressures, as noted above.

During a compaction process, the first tool portion 192 applies a force F1 on the composite component 100 along the vertical and lateral directions V, L and the second tool portion 194 applies counteracting forces F2 and F3 on the composite component 100 along the lateral direction L and vertical direction V, respectively. As the composite component 100 is compacted by the compaction tool 190, the retaining plies 170 of the second laminate portion 112 drives the other plies 118 of the second laminate portion 112 into the joint interface 124. More specifically, the retaining ply 170 provides a structure to which the applied force F1 may drive the other plies 118 of the second laminate portion 112 into the angled first surface 128 of the noodle 126. In this way, the second laminate portion 112 is driven into the joint interface 124, and consequently, void defects in the composite component 100 at the joint interface 124 are reduced.

Figure 12:
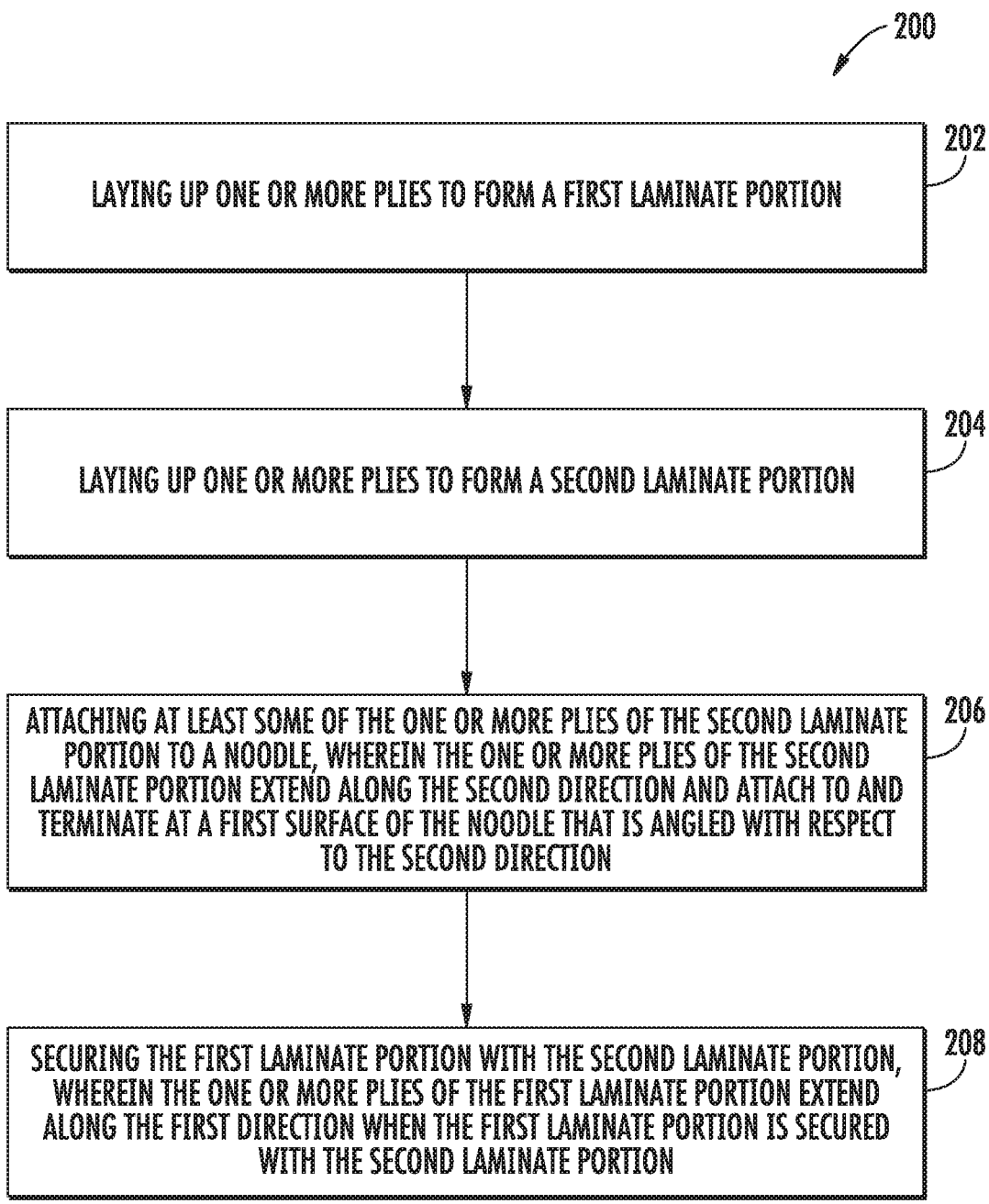
FIG. 12 provides a flow diagram of an exemplary method according to an exemplary embodiment of the present disclosure.

FIG. 12 provides a flow diagram of an exemplary method (200) for forming a composite component according to an exemplary embodiment of the present disclosure. The composite component defines a first direction and a second direction. The first direction can be a lateral direction and the second direction can be a vertical direction, for example. In some implementations, the first direction is orthogonal to the second direction. Method (200) may be utilized to form one of the composite components depicted in FIGS. 2 through 11. In some implementations, the composite component is formed of a CMC material. In yet other implementations, the composite component is formed of a PMC material. In yet further implementations, the composite component is formed of some other matrix and reinforcement material.

At (202), the method (200) includes laying up one or more plies to form a first laminate portion. For instance, plies 116 may be laid up to form first laminate portion 110. The first laminate portion 110 may have any suitable number of plies 116. The plies 116 of the first laminate portion 110 may be made of any suitable material.

At (204), the method (200) includes laying up one or more plies to form a second laminate portion. For instance, plies 118 may be laid up to form second laminate portion 112. The second laminate portion 112 may have any suitable number of plies 118. The plies 118 of the second laminate portion 112 may be made of any suitable material.

At (206), the method (200) includes attaching at least one of the one or more plies of the second laminate portion to a noodle, wherein the one or more plies of the second laminate portion extend along the second direction and attach to and terminate at a first surface of the noodle that is angled with respect to the second direction. For example, as shown in FIG. 2, at least some of the plies 118 of the second laminate portion 112 are attached to the noodle 126. In addition, the plies 118 of the second laminate portion 112 extend along the second direction, which may be the vertical direction V as shown in FIG. 2, and attach to and terminate at or into the first surface 128 of the noodle 126. As further shown, the first surface 128 is angled with respect to the second direction, e.g., the vertical direction V in this example. For instance, the first surface may be angled with respect to the second direction by forty-five degrees (45°). In addition, as shown in FIG. 2, in some implementations of method (200), at least some of the plies 118 of the second laminate portion 112 may have successively different lengths along the second direction (e.g., the vertical direction V) such that they attach to and terminate at the first surface 128 of the noodle 126 in a staggered arrangement.

At (208), the method (200) includes securing the first laminate portion with the second laminate portion, wherein the one or more plies of the first laminate portion extend along the first direction when the first laminate portion is secured with the second laminate portion. Continuing with example above, with reference to FIG. 2, the first laminate portion 110 is shown secured with or to the second laminate portion 112. For instance, the first laminate portion 110 is secured with the second laminate portion 112 by attaching butt surface 132 of the noodle 126 with the one or more plies 116 of the first laminate portion 110. Further, as shown in FIG. 2, the first laminate portion 110 is further secured with the second laminate portion 112 by attaching a cover laminate portion 114 to the first laminate portion 110 and the second laminate portion 112. As shown in FIG. 2, additionally, one or more of the plies 120 of the cover laminate portion 114 may extend along and attach to the second surface 130 of the noodle 126. The second surface 130 may have a curved surface as shown in FIG. 2, a straight angle surface as shown in FIG. 4, or a combination straight angle and curved surface as shown in FIG. 5.

In some implementations, the second laminate portion includes a retaining ply that has a retaining portion that is detached from the other plies of the second laminate portion, and wherein during attaching, the retaining portion of the retaining ply extends along at least a portion of a second surface of the noodle that is angled with respect to the second direction. For example, as shown in FIGS. 8 and 9, the second laminate portion 112 includes a first retaining ply 170 that has a retaining portion 174 (FIG. 9) that is detached from the other plies 118 of the second laminate portion 112. Further, as shown, when the second laminate portion 112 is attached to the noodle, which is the first noodle 160 in this example, the retaining portion 174 of the retaining ply 170 extends along at least a portion of the second surface 130 of the noodle 160 that is angled with respect to the second direction (e.g., the vertical direction V). In this way, in some implementations, when the composite component 100 is compacted, the composite component 110 is compacted such that the retaining ply 170 extending along the second surface 130 forces the other plies 118 of the second laminate portion 112 against the first surface 128 of the noodle 160.

In some further implementations, the noodle has a length along the second direction (e.g., the lateral direction L), and wherein when the retaining ply 170 is attached to the noodle 160, the retaining portion 174 of the retaining ply 170 extends from the noodle 160 a distance along the second direction that is at least a quarter of the length of the noodle along the second direction. In yet other implementations, the noodle has a length along the second direction, as noted above, and wherein when the retaining ply 170 is attached to the noodle 160, the retaining portion 174 of the retaining ply 170 extends from the noodle 160 a distance along the second direction that is at least a half of the length of the noodle along the second direction.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A composite component defining a first direction and a second direction, the composite component comprising:
    a first laminate portion having a length extending along the first direction;
    a second laminate portion having a length extending along the second direction, the second laminate portion comprised of a plurality of plies; and
    a noodle positioned at a joint interface between the first laminate portion and the second laminate portion, the noodle having a first surface that is angled with respect to the second direction, wherein at least one of the plurality of plies of the second laminate portion terminate and are attached to the noodle along the first surface, and
    wherein the plurality of plies of the second laminate portion that terminate and are attached to the noodle along the first surface have successively different lengths such that the plurality of plies terminate and attach to the first surface in a staggered arrangement.

2. The composite component of claim 1, wherein the noodle comprises a butt surface extending along the first direction, and wherein the butt surface is attached to the first laminate portion of the composite component.

3. The composite component of claim 1, wherein the noodle comprises a second surface that is angled with respect to the second direction.

4. The composite component of claim 3, wherein at least one of the plurality of plies of the second laminate portion terminate and are attached to the noodle along the second surface.

5. The composite component of claim 3, wherein the composite component comprises a cover ply that extends along the first laminate portion, attaches to and extends along at least a portion of the second surface of the noodle, and then extends along the second laminate portion.

6. The composite component of claim 3, wherein the noodle comprises a butt surface attached to the first laminate portion of the composite component, and wherein the second laminate portion comprises a retaining ply that extends along the second laminate portion, attaches to and extends along at least a portion of the second surface of the noodle, and then terminates proximate an intersection between the second angled surface and the butt surface.

7. The composite component of claim 3, wherein the noodle comprises a second surface that is curved.

8. The composite component of claim 1, wherein the noodle is a first noodle, and wherein the composite component comprises a second noodle positioned at the joint interface between the first laminate portion and the second laminate portion.

9. The composite component of claim 8, wherein the second noodle has a first surface that is angled with respect to the second direction.

10. The composite component of claim 9, wherein the second laminate portion defines a vertical centerline, and wherein the first surface of the first noodle and the first surface of the second noodle are angled with respect to the second direction such that the first surfaces converge inward toward an intersection between the vertical centerline and the first laminate portion.

11. The composite component of claim 1, wherein the first surface has a straight angle portion and a curved portion, and wherein at least one of the plurality of plies of the second laminate portion terminate and are attached to the noodle along the straight angle portion of the first surface and wherein a cover ply extends along and attaches to the curved portion of the first surface.

12. A composite component defining a second direction and a first direction, the composite component comprising:
- a first laminate portion having a length extending along the first direction;
- a second laminate portion having a length extending along the second direction, the second laminate portion comprised of a plurality of plies, the plurality of plies including a retaining ply that has a retaining portion that is detached from the other plies of the plurality of plies; and
- a noodle positioned at a joint interface between the first laminate portion and the second laminate portion, the noodle having a first surface that is angled with respect to the second direction, a second surface that is angled with respect to the second direction, and a butt surface attached to the first laminate portion;
- wherein at least one ply of the plurality of plies of the second laminate portion terminates and is attached to the noodle along the first surface and the retaining portion of the retaining ply is attached to the second surface of the noodle and extends to and terminates at an intersection between the second angled surface and the butt surface.

13. The composite component of claim 12, wherein the plurality of plies of the second laminate portion that terminate and are attached to the noodle along the first surface have successively different lengths such that the plurality of plies terminate and attach to the first surface in a staggered arrangement.

14. The composite component of claim 12, wherein the first surface has a straight angle portion and a curved portion, and wherein at least one of the plurality of plies of the second laminate portion terminate and are attached to the noodle along the straight angle portion of the first surface and wherein a cover ply extends along and attaches to the curved portion of the first surface.

15. A composite component defining a first direction and a second direction, the composite component comprising:
- a first laminate portion having a length extending along the first direction;
- a second laminate portion having a length extending along the second direction, the second laminate portion having a plurality of plies;
- a first noodle positioned at a joint interface between the first laminate portion and the second laminate portion, the first noodle having:
  - a butt surface extending along the first direction, the first laminate portion of the composite component being attached to the butt surface of the first noodle;
  - a first surface angled with respect to the second direction, wherein at least two plies of the plurality of plies of the second laminate portion terminate and are attached to the first noodle along the first surface, wherein the at least two plies of the plurality of plies of the second laminate portion that terminate and are attached to the first noodle along the first surface have successively different lengths such that the at least two plies of the plurality of plies terminate and attach to the first surface of the first noodle in a staggered arrangement; and
- a second noodle positioned at the joint interface between the first laminate portion and the second laminate portion, the second noodle having:
  - a butt surface extending along the first direction, the first laminate portion of the composite component being attached to the butt surface of the second noodle;
  - a first surface angled with respect to the second direction, wherein at least two plies of the plurality of plies of the second laminate portion terminate and are attached to the second noodle along the first surface, wherein the at least two plies of the plurality of plies of the second laminate portion that terminate and are attached to the second noodle along the first surface have successively different lengths such that the at least two plies of the plurality of plies terminate and attach to the first surface of the second noodle in a staggered arrangement.

16. The composite component of claim 15, wherein the composite component is formed of a ceramic matrix composite material.

17. The composite component of claim 15, wherein the plurality of plies of the second laminate portion include an abutting ply that abuts the first laminate portion.

18. The composite component of claim 17, wherein the at least two plies of the plurality of plies that terminate and attach to the first surface of the first noodle in the staggered arrangement and the at least two plies of the plurality of plies that terminate and attach to the first surface of the second noodle in the staggered arrangement increase in length as they approach the abutting ply.

19. The composite component of claim 15, wherein the first direction and the second direction are orthogonal to one another.

20. The composite component of claim 15, wherein the first surface of the first noodle and the first surface of the second noodle converge toward one another as they extend toward the first laminate portion along the second direction.

* * * * *